(12) United States Patent
Sovine et al.

(10) Patent No.: US 11,850,917 B2
(45) Date of Patent: Dec. 26, 2023

(54) SNAP FIT HEAT EXCHANGER BRACKET

(71) Applicant: Ford Global Technologies, LLC, Dearborn, MI (US)

(72) Inventors: Michael Brett Sovine, Canton, MI (US); Kenneth James Hayes, Northville Township, MI (US); Jeff James Cremering, Livonia, MI (US); Korey Martin Erickson, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1043 days.

(21) Appl. No.: 16/717,955

(22) Filed: Dec. 17, 2019

(65) Prior Publication Data
US 2021/0178861 A1 Jun. 17, 2021

(51) Int. Cl.
| | |
|---|---|
| *B60H 1/32* | (2006.01) |
| *B60K 11/08* | (2006.01) |
| *B60K 11/04* | (2006.01) |
| *B60R 19/52* | (2006.01) |
| *F01P 3/18* | (2006.01) |

(52) U.S. Cl.
CPC ............ *B60H 1/3229* (2013.01); *B60K 11/04* (2013.01); *B60K 11/08* (2013.01); *B60K 11/085* (2013.01); *B60R 19/52* (2013.01); *F01P 3/18* (2013.01); *F01P 2070/52* (2013.01)

(58) Field of Classification Search
CPC . F01P 3/18; B60R 19/52; B60K 11/08; B60K 11/04; B60H 1/3229
See application file for complete search history.

(56) References Cited

U.S. PATENT DOCUMENTS

| | | | | |
|---|---|---|---|---|
| 6,059,019 | A | * | 5/2000 | Brost .................... F28D 1/0435 123/41.51 |
| 7,117,927 | B2 | | 10/2006 | Kent et al. |
| 8,210,298 | B2 | | 7/2012 | Hemmersmeier |
| 2001/0013405 | A1 | * | 8/2001 | Mangold ................. F28F 9/002 165/140 |
| 2018/0066901 | A1 | * | 3/2018 | Carlson ................... F28F 9/001 |

FOREIGN PATENT DOCUMENTS

| | | |
|---|---|---|
| DE | 102012202584 A1 | 8/2013 |
| EP | 1225120 B1 | 9/2008 |

\* cited by examiner

*Primary Examiner* — Kevin A Lathers
(74) *Attorney, Agent, or Firm* — Burr & Forman LLP

(57) ABSTRACT

A heat exchanger bracket for an automotive cooling module may include a first mounting assembly disposed at a first end of the heat exchanger bracket, a second mounting assembly disposed at a second end of the heat exchanger bracket, and a bracket container disposed between the first and second ends of the heat exchanger bracket. The first mounting assembly may include a first free floating retention point, and the second mounting assembly may include a second free floating retention point. The bracket container may be configured to receive a heat exchanger. The bracket container may include a first flexible retainer disposed at a first longitudinal end thereof, and a second flexible retainer disposed at a second longitudinal end thereof. The first and second flexible retainers may be configured to engage opposing longitudinal ends of the heat exchanger responsive to insertion of the heat exchanger into the bracket container.

18 Claims, 10 Drawing Sheets

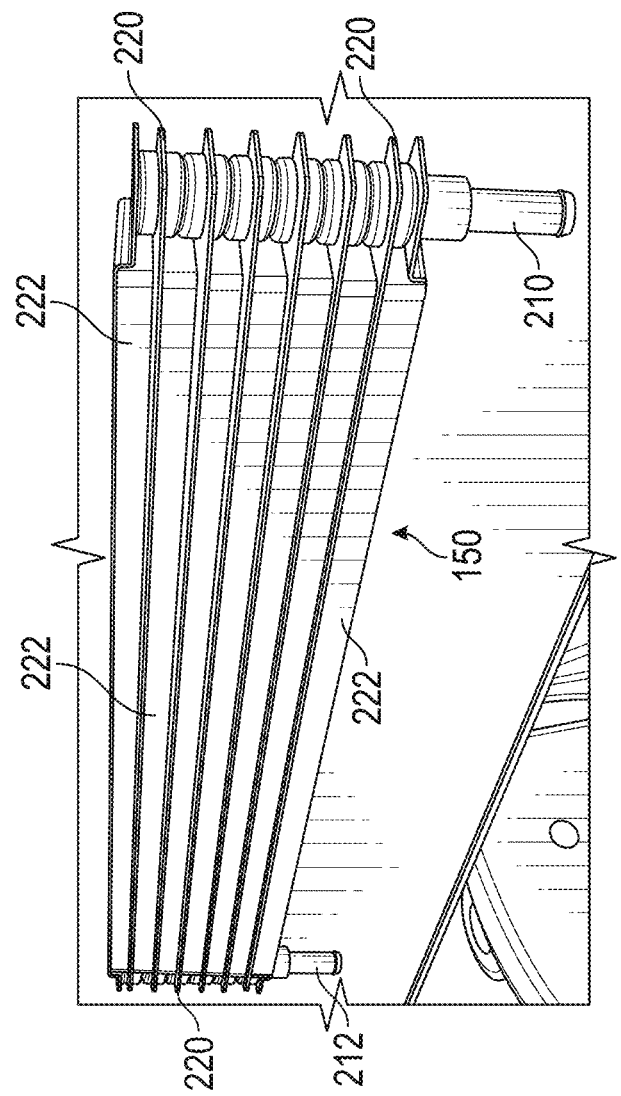

SNAP FIT HEAT EXCHANGER BRACKET

TECHNICAL FIELD

Example embodiments generally relate to vehicle cooling modules and, more particularly, relate to a heat exchanger bracket for a vehicle cooling module.

BACKGROUND

A cooling module that is used in automotive applications will often include a condenser, an engine cooling fan, a radiator, and one or more heat exchangers (e.g., an auxiliary transmission oil cooler). Ambient air generally flows through the cooling module and, when employed, the engine cooling fan can operate to ensure that air is provided for cooling either for larger loads or when the vehicle is not moving or otherwise generating sufficient airflow. The engine is cooled by the radiator, and climate control can be provided by the condenser in conjunction with air conditioning system components.

Various engine systems or components (e.g., the transmission) may also be cooled by heat exchangers. In a typical arrangement, the heat exchanger may cool an operating fluid (e.g., transmission fluid) by providing heat transfer interfaces (e.g., fins) over which airflow can readily be provided to remove heat from the operating fluid. The heat transfer interfaces are typically made from metallic structures that have very good heat transfer characteristics. However, these metallic structures can vary in length due to thermal expansion and contraction in response to cyclic temperature changes associated with hotter or colder operating fluids and/or ambient environments. In some cases, road load inputs as well as the thermal expansion of these structures can be significant enough to stress the brackets that are used to support the heat exchanger and/or the mounting points used to mount the heat exchanger to or within the cooling module.

Thus, it may be desirable to develop a durable bracket that can handle large thermal cycles in addition to road load inputs.

BRIEF SUMMARY OF SOME EXAMPLES

In accordance with an example embodiment, a heat exchanger bracket for an automotive cooling module may be provided. The heat exchanger bracket may include a first mounting assembly disposed at a first end of the heat exchanger bracket, a second mounting assembly disposed at a second end of the heat exchanger bracket, and a bracket container disposed between the first and second ends of the heat exchanger bracket. The first mounting assembly may include a first free floating retention point, and the second mounting assembly may include a second free floating retention point. The bracket container may be configured to receive a heat exchanger. The bracket container may include a first flexible retainer disposed at a first longitudinal end thereof, and a second flexible retainer disposed at a second longitudinal end thereof. The first and second flexible retainers may be configured to engage opposing longitudinal ends of the heat exchanger responsive to insertion of the heat exchanger into the bracket container.

In another example embodiment, a cooling module may be provided. The cooling module may include a radiator, a cooling fan, a condenser and a heat exchanger assembly. The heat exchanger assembly may include a heat exchanger and a heat exchanger bracket. The heat exchanger bracket may include a first mounting assembly disposed at a first end of the heat exchanger bracket, a second mounting assembly disposed at a second end of the heat exchanger bracket, and a bracket container disposed between the first and second ends of the heat exchanger bracket. The first mounting assembly may include a first free floating retention point, and the second mounting assembly may include a second free floating retention point. The bracket container may be configured to receive the heat exchanger. The bracket container may include a first flexible retainer disposed at a first longitudinal end thereof, and a second flexible retainer disposed at a second longitudinal end thereof. The first and second flexible retainers may be configured to engage opposing longitudinal ends of the heat exchanger responsive to insertion of the heat exchanger into the bracket container.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 illustrates a perspective view of a heat exchanger in accordance with an example embodiment;

DETAILED DESCRIPTION

Figure 1:
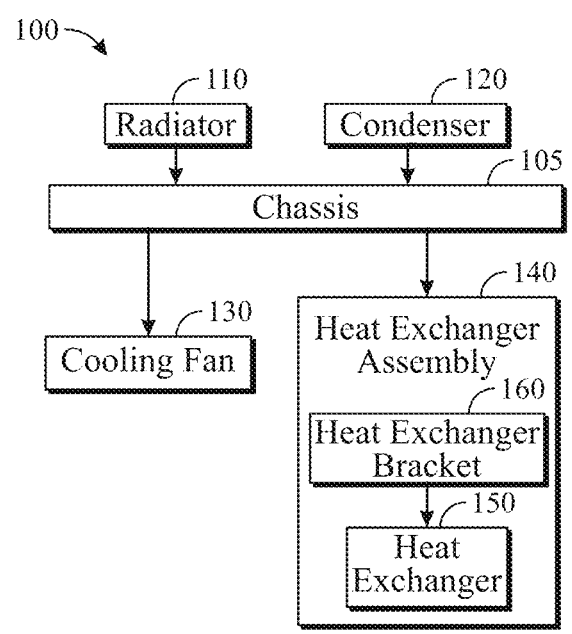
FIG. 1 illustrates a block diagram of a vehicle cooling module in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide an improved design for a heat exchanger bracket of an automotive cooling module. As a result, cost savings may be achieved and the robustness of the heat exchanger bracket and durability of the design may also be improved.

FIG. 1 illustrates a block diagram of a cooling module 100 of an example embodiment. As shown in FIG. 1, the components of the cooling module 100 may be operably coupled to a chassis 105 of a vehicle. Of note, although the components of FIG. 1 are connected to the chassis 105, it should be appreciated that such connection may be either direct or indirect. Moreover, some of the components of the cooling module 100 may be connected to the chassis 105 via intermediate connections to other components either of the cooling module 100 or of other nearby systems or components.

The cooling module 100 may include a radiator 110, a condenser 120, a cooling fan 130 and a heat exchanger assembly 140. The heat exchanger assembly 140 may include one or more instances of a heat exchanger 150. In an example embodiment, each of the instances of the heat exchanger 150 may include a corresponding instance of a heat exchanger bracket 160. The heat exchanger bracket 160 may operably couple the heat exchanger 150 to the chassis 105 (again either directly or indirectly).

Figure 2:
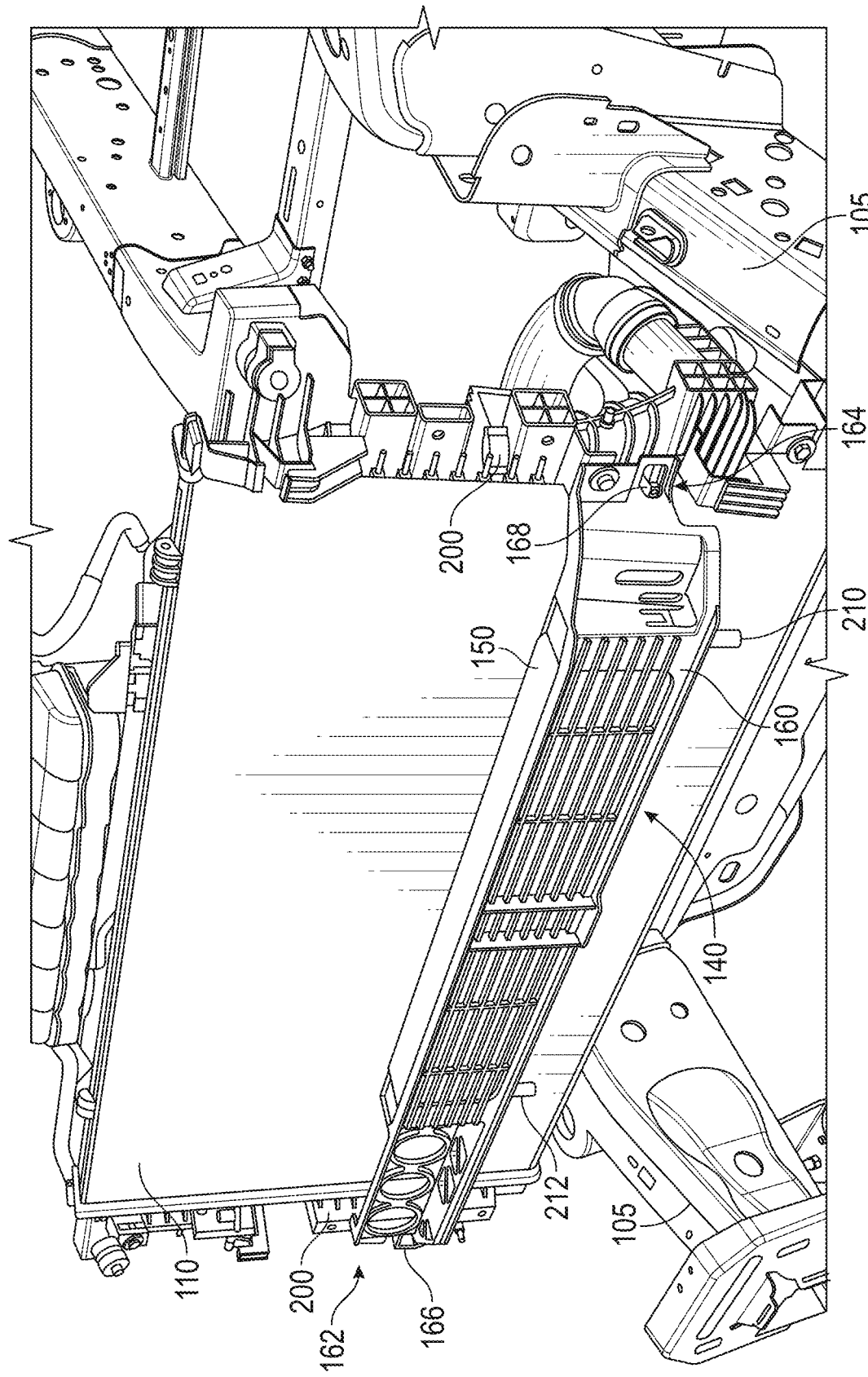
FIG. 2 illustrates a perspective view of some components of the cooling module of FIG. 1 in isolation in accordance with an example embodiment.

FIG. 2 illustrates a perspective view of some components of the cooling module of FIG. 1 in isolation in accordance with an example embodiment. In this regard, FIG. 2 illustrates portions of the chassis 105, and also illustrate the radiator 110. The heat exchanger assembly 140 may be mounted to frame members 200 that may be extended from the chassis 105 or may otherwise be portions of the radiator 110. The frame members 200 may be provided to extend substantially vertically and may be disposed at opposite lateral sides (e.g., driver side and passenger side) of the vehicle. Accordingly, the heat exchanger assembly 140 may extend between the frame members 200 and therefore between the opposing lateral sides of the vehicle to define a first reference direction (e.g., side-to-side or horizontally).

The heat exchanger bracket 160 may be operably coupled to the frame members via a first mounting assembly 162 and a second mounting assembly 164. The first mounting assembly 162 may be disposed at a first end of the heat exchanger bracket 160 to operably couple the first mounting assembly 162 to one of the frame members 200 via a first free floating retention point 166. The second mounting assembly 164 may be disposed at a second end of the heat exchanger bracket 160 to operably couple the second mounting assembly 164 to the other one of the frame members 200 via a second free floating retention point 168.

A specific structure for embodying each respective one of the heat exchanger 150 and the heat exchanger bracket 160 is also shown in FIG. 2. In this regard, a perspective view of the heat exchanger 150 of an example embodiment is shown in isolation in FIG. 3. The heat exchanger 150 may include an inlet tube 210 and an outlet tube 212 that may each be operably coupled to a fluid-based system for cooling a component (e.g., a transmission) of the vehicle and fluid (e.g., transmission fluid) may flow through the system and into the inlet tube 210 before passing through the heat exchanger 150 and then out the outlet tube 212 back to the system. As such, the fluid may be relatively hotter coming into the inlet tube 210 than when leaving the outlet tube 212 due to the heat exchanged by the heat exchanger 150.

The heat exchanger 150 may include a plurality of heat exchange interface surfaces (e.g., fins 220) that are operably coupled to channels 222 that are formed to pass the fluid from the inlet tube 210 to the outlet tube 212 responsive to a pressure source (e.g., a pump) associated with the system. The fluid may therefore be pumped into the inlet tube 210 at a high temperature and heat may transfer from the fluid to the metal of the channels 222 to the fins 220. Air flowing over the fins 220 may then remove heat from the fins 220 by warming the air and the fluid may be cooled before exiting the heat exchanger 150 at the outlet tube 212. As mentioned above, the metal used to form the channels 222 and the fins 220 of the heat exchanger 150 may expand and contract in size due to thermal expansion as temperature of the fluid changes due to various factors. Thus, when the fluid is very hot, the longitudinal length of the channels 222 (e.g., measured in a horizontal direction between the inlet tube 210 and the outlet tube 212) may increase relative to the length that could be measured when the fluid is relatively cold. Expansion and contraction may also be experienced in the width and height directions. This change in the physical dimensions of the heat exchanger 150 may, in some cases, also provide stresses on the heat exchanger bracket 160 or other components used to fix the heat exchanger 150 in place. These thermal stresses may occur while the heat exchanger bracket 160 is also being subjected to the normal stresses that can occur during driving (i.e., road load). However, the heat exchanger bracket 160 of an example embodiment is configured to avoid this potential problem.

In particular, the heat exchanger bracket 160 may be made of a flexible plastic material. The use of plastic may reduce the cost of providing corrosion protection, since the plastic material may have better corrosion resistance properties than many metallic materials. The use of a flexible plastic may also allow the heat exchanger bracket 160 to withstand significant road loads. In some embodiments, the heat exchanger bracket 160 may be made of a polypropylene material with glass fibers. For example, a 30% glass fiber reinforced polypropylene material or molding compound (e.g., PP-GF30) may be used in some cases.

The use of flexible plastic material may be very helpful in reducing costs and improving durability. However, the design of the heat exchanger bracket 160 of an example embodiment, and the mounting strategies employed for mounting the heat exchanger bracket 160 within the cooling module 100 and/or vehicle may also be advantageous in achieving improved performance and durability at lower cost. In this regard, some example embodiments may employ a mounting strategy and design elements that eliminate much of the fastening hardware that would otherwise be required to hold the heat exchanger bracket 160 in place, and hold the heat exchanger 150 within the heat exchanger bracket 160. For example, a single point, free floating attachment strategy may be employed to allow for significant road load input tolerance and cooling module attachment variation. Additionally, significantly improved robustness may be achieved by designing the heat exchanger bracket 160 to allow for the thermal expansion and contraction of the heat exchanger 150 without reducing durability or increasing costs.

Figure 4A:
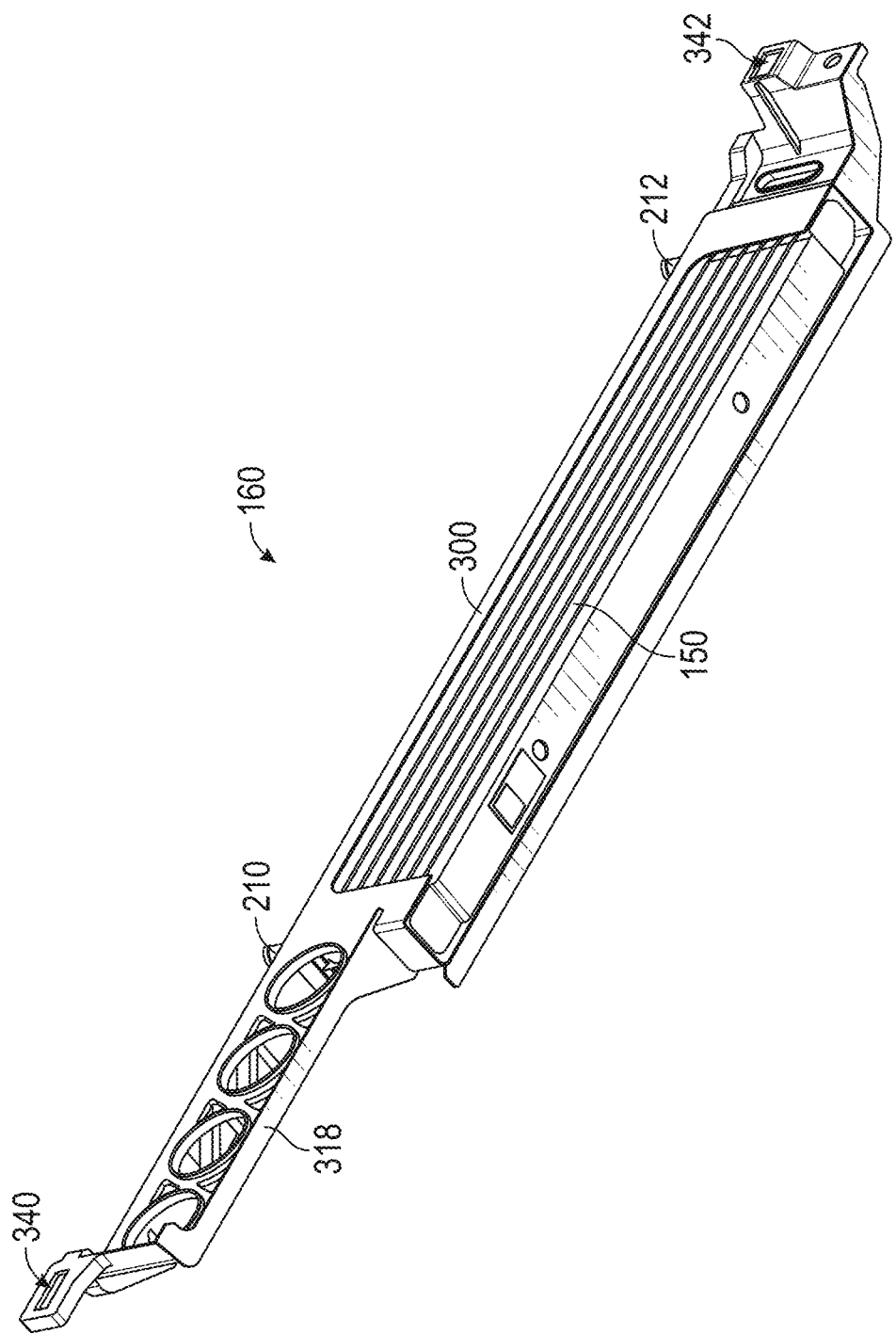
FIG. 4A is an isolated perspective view of a heat exchanger bracket having a heat exchanger disposed therein in accordance with an example embodiment.
Figure 4B:
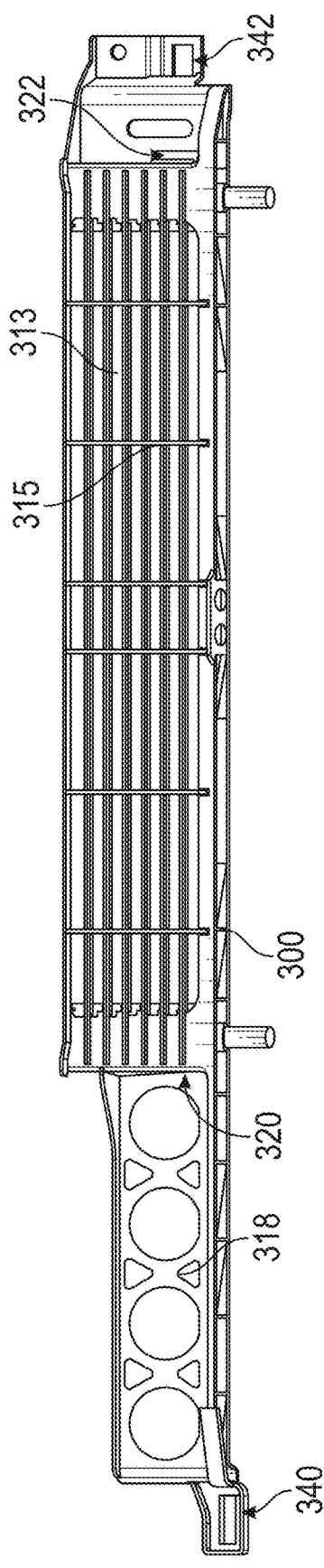
FIG. 4B is an isolated front view of the heat exchanger bracket of FIG. 4A in accordance with an example embodiment.
Figure 4C:
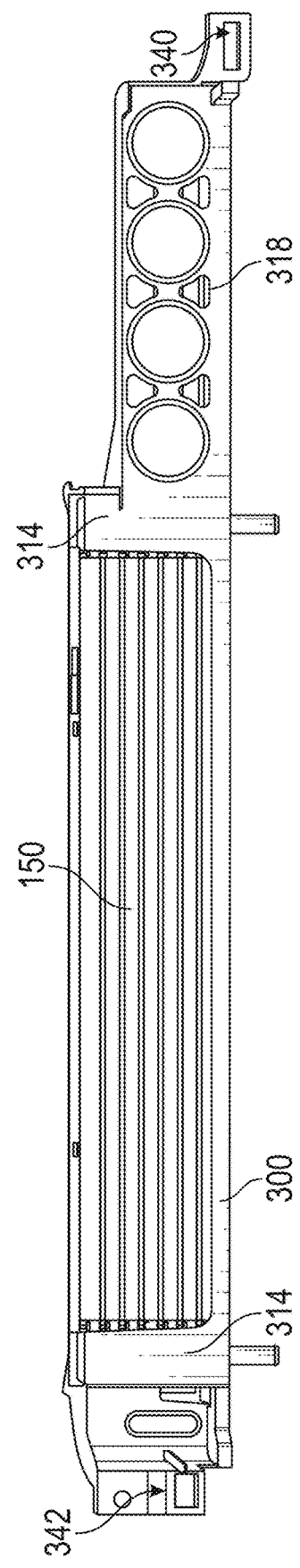
FIG. 4C is an isolated rear view of the heat exchanger bracket of FIG. 4A in accordance with an example embodiment.
Figure 5A:
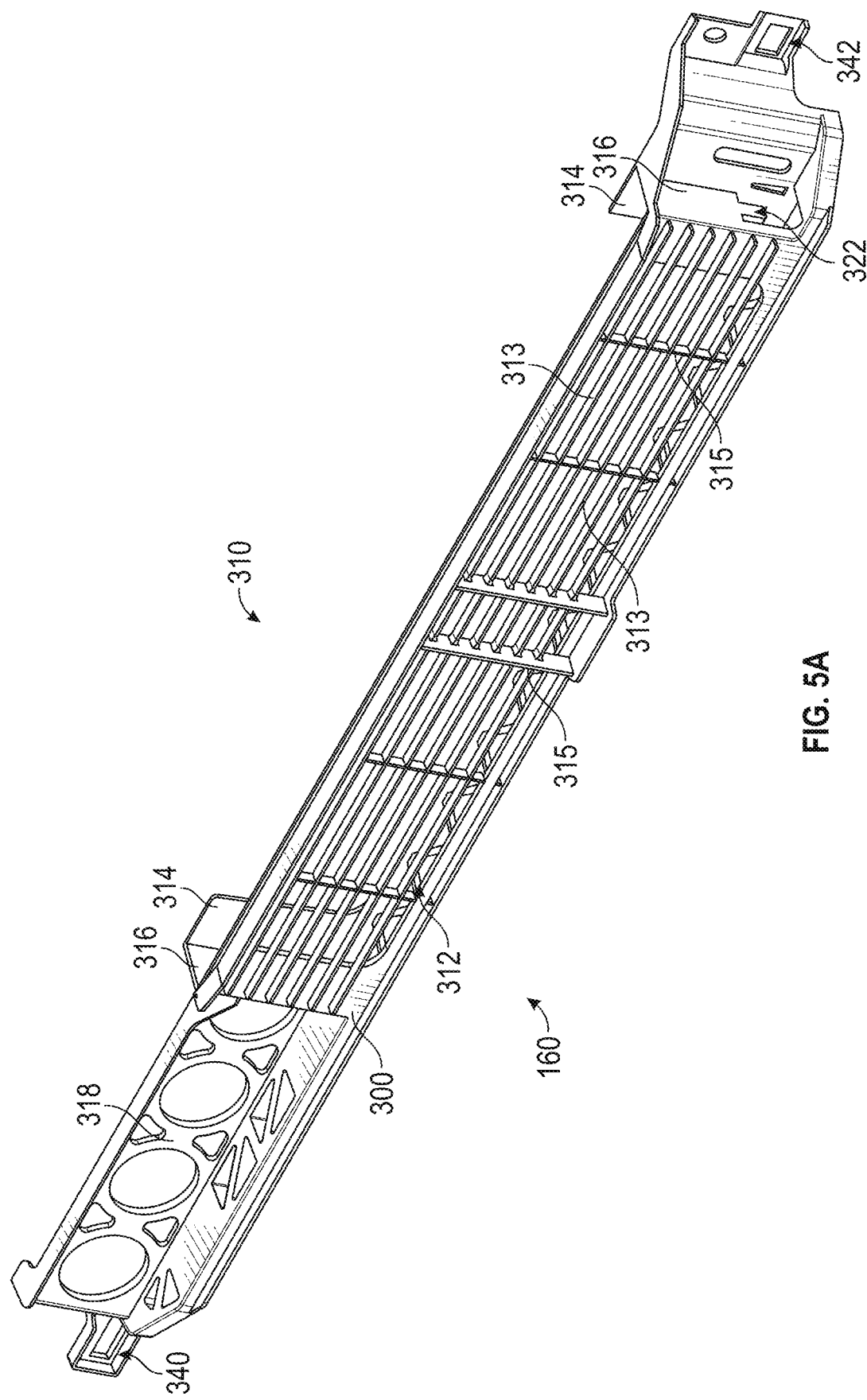
FIG. 5A is an isolated perspective view of a heat exchanger bracket without the heat exchanger disposed therein in accordance with an example embodiment.
Figure 5B:
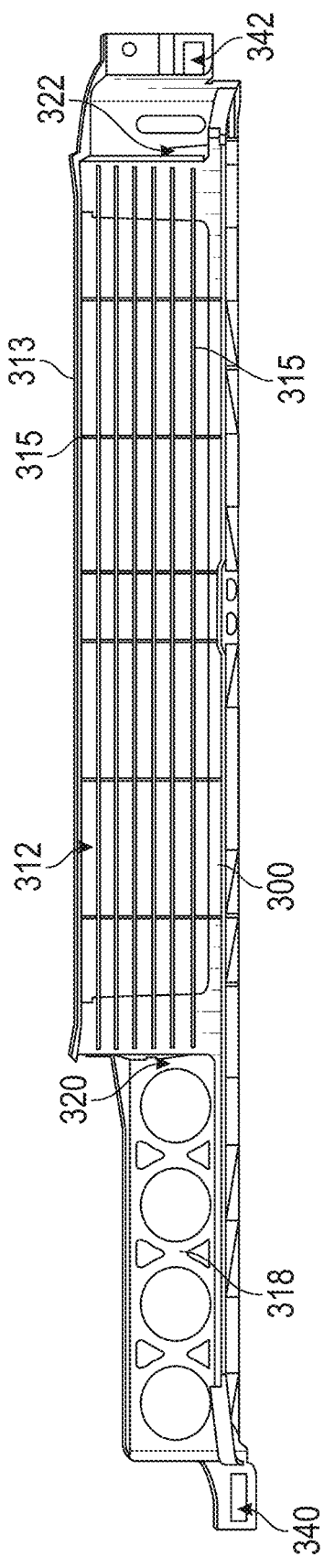
FIG. 5B is an isolated front view of the heat exchanger bracket of FIG. 5A in accordance with an example embodiment.
Figure 5C:
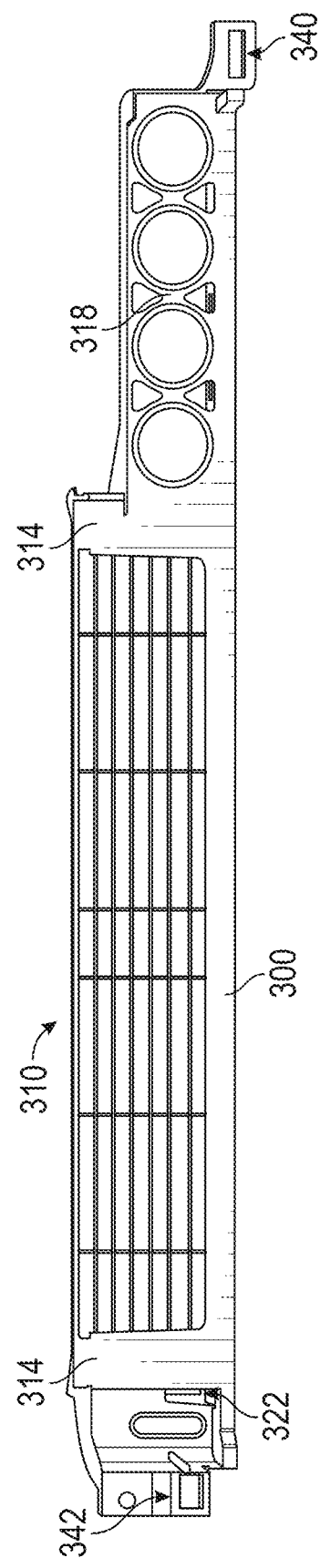
FIG. 5C is an isolated rear view of the heat exchanger bracket of FIG. 5A in accordance with an example embodiment.

FIGS. 4 and 5 show various aspects of the heat exchanger bracket 160 to facilitate a further discussion of the design improvements discussed above. In this regard, FIG. 4, which is defined by FIGS. 4A, 4B and 4C, illustrates various views of the heat exchanger bracket 160 with the heat exchanger 150 positioned inside. Meanwhile, FIG. 5, which is defined by FIGS. 5A, 5B and 5C, shows corresponding views to those of FIG. 4 except that the heat exchanger 150 has been removed. FIGS. 4A and 5A each show a perspective view of the heat exchanger bracket 160, FIGS. 4B and 5B each show front views of the heat exchanger bracket 160, and FIGS. 4C and 5C each show rear views of the heat exchanger bracket 160.

Referring now primarily to FIGS. 4 and 5, the heat exchanger bracket 160 may be defined by a base portion 300 that may extend substantially along a longitudinal length of the heat exchanger bracket 160 from the first end to the second end of the heat exchanger bracket 160. The base portion 300 may be an elongated member that extends between the first mounting assembly 162 and the second mounting assembly 164. The base portion 300 may have a width that extends in a horizontal plane (when mounted to the vehicle) and provides support for a bottom portion of the heat exchanger 150.

A bracket container 310 may be defined between the first and second ends of the heat exchanger bracket 160 to receive the heat exchanger 150 therein. The bracket container 310 may be formed by a screen assembly 312 at a front side thereof, at least part of the base portion 300 at a bottom thereof, and backing members 314 at a back side thereof. Side members 316 may be disposed at opposite longitudinal ends of the bracket container 310, and the side members 316 (and backing members 314) may mirror each other in some cases. The side members 316 may extend substantially perpendicular to a plane in which the screen assembly 312 lies, and a plane in which the backing members 314 lie. The plane in which the backing members 314 lie may be substantially parallel to the plane in which the screen assembly 312 lies, and may be spaced apart from the screen assembly 312 by the side members 316. The respective planes in which each of the side members 316, the backing members 314, and the screen assembly 312 lie may be substantially perpendicular to the plane in which the base portion 300 lies.

In an example embodiment, the backing members 314 may extend over only a portion of the back of the bracket container 310 leaving the back side of the bracket container 310 mostly open. Meanwhile, a top portion of the bracket container 310 may be left fully open so that the heat exchanger 150 can be inserted into the bracket container 310 through the top portion of the bracket container 310 and the heat exchanger bracket 160. The bracket container 310 of some embodiments may not be as long as the distance between the first and second ends of the heat exchanger bracket 160. When such a length mismatch exists, an extension portion 318 may be provided to extend from at least one end of the bracket container 310 to bridge the remaining distance between the first and second ends of the heat exchanger bracket 160 and provide support for the heat exchanger bracket 160.

The screen assembly 312 may include a plurality of horizontal ribs 313 that may extend substantially parallel to each other between the first and second ends of the bracket container 310. The screen assembly 312 may also include one or more vertically extending ribs 315 spaced apart from each along the longitudinal length of the bracket container 310 for additional support. The horizontal ribs 313 and the vertically extending ribs 315 of the screen assembly 312 may protect the heat exchanger 150 from impacts (e.g., due to rocks or other debris), while still providing for a relatively unimpeded path for air to flow around the channels 222 and fins 220 of the heat exchanger 150. The open back of the bracket container 310 (e.g., between the backing members 314) may also facilitate free flow of air around the heat exchanger 150.

The bracket container 310 may further include a first flexible retainer 320 disposed at a first longitudinal end thereof, and a second flexible retainer 322 disposed at a second longitudinal end thereof. The first and second flexible retainers 320 and 322 may be configured to engage opposing longitudinal ends of the heat exchanger 150 responsive to insertion of the heat exchanger 150 into the bracket container 310 in a way that is relatively unaffected by changes to the length of the heat exchanger 150. In this regard, since the heat exchanger 150 may expand and contract due to thermal cycles, the bracket container 310 may be made large enough to accommodate the expansion and contraction of the heat exchanger 150. Thus, for example, the distance between the backing members 314 and the screen assembly 312 may be larger than a width of the channels 222 and/or fins 220 of the heat exchanger 150 even when accounting for the thermal cycles. Moreover, a distance between the opposing side members 316 of the bracket container 310 may also be larger than a length of the heat exchanger 150 when accounting for the thermal cycles. In other words, the bracket container 310 may be both longer and wider than the largest length and width of the heat exchanger 150 when the heat exchanger 150 passes through normal thermal cycling.

With the bracket container 310 being larger than the heat exchanger 150, the first and second flexible retainers 320 and 322 may be configured to operate equally effectively to hold the heat exchanger 150 in place regardless of the thermal condition (and therefore size parameters) of the heat exchanger 150. To accomplish this, the first and second flexible retainers 320 and 322 may be formed as flexible fingers (i.e., a first flexible finger and a second flexible finger, respectively). The configuration of the first and second flexible retainers 320 and 322 will now be described in reference to FIGS. 6A and 6B, which show the first flexible retainer 320 and the second flexible retainer 322, respectively.

In an example embodiment, the first and second flexible retainers 320 and 322 may be formed at respective ones of the side members 316. Thus, the first and second flexible retainers 320 and 322 may extend into the bracket container 310 from opposing sides of the bracket container 310 toward each other in order to engage opposite longitudinal ends of the heat exchanger 150. In this regard, for example, the first and second flexible retainers 320 and 322 may extend toward each other such that, although the side members 316 are spaced apart by a distance larger than the longest possible length of the heat exchanger 150, the distance between at least a portion of the first and second flexible retainers 320 and 322 is less than a minimal length of the heat exchanger 150 during thermal cycling. Thus, no matter what the temperature of the fluid in the heat exchanger 150 may be, and the corresponding length of the heat exchanger 150 may be, the first and second flexible retainers 320 and 322 will engage and retain the opposing ends of the heat exchanger 150. Moreover, by placing the first and second flexible retainers 320 and 322 in the side members 316, the top portion of the bracket container 310 and the back portion can both remain open and therefore not inhibit airflow, while also permitting easy installation (and removal) of the heat exchanger 150.

The first and second flexible retainers 320 and 322 may be configured to slidingly engage (in a sequential manner) fins 220 of the heat exchanger 150 to allow one-way movement of the heat exchanger 150 (i.e., in the inward or installing direction) during insertion of the heat exchanger 150 into the bracket container 310. Meanwhile, the first and second flexible retainers 320 and 322 may be configured to prevent removal of the heat exchanger 150 by interference fit with fins 220 that have already passed beyond the first and second flexible retainers 320 and 322. This arrangement is shown in greater detail in FIG. 6A.

Figure 6A:
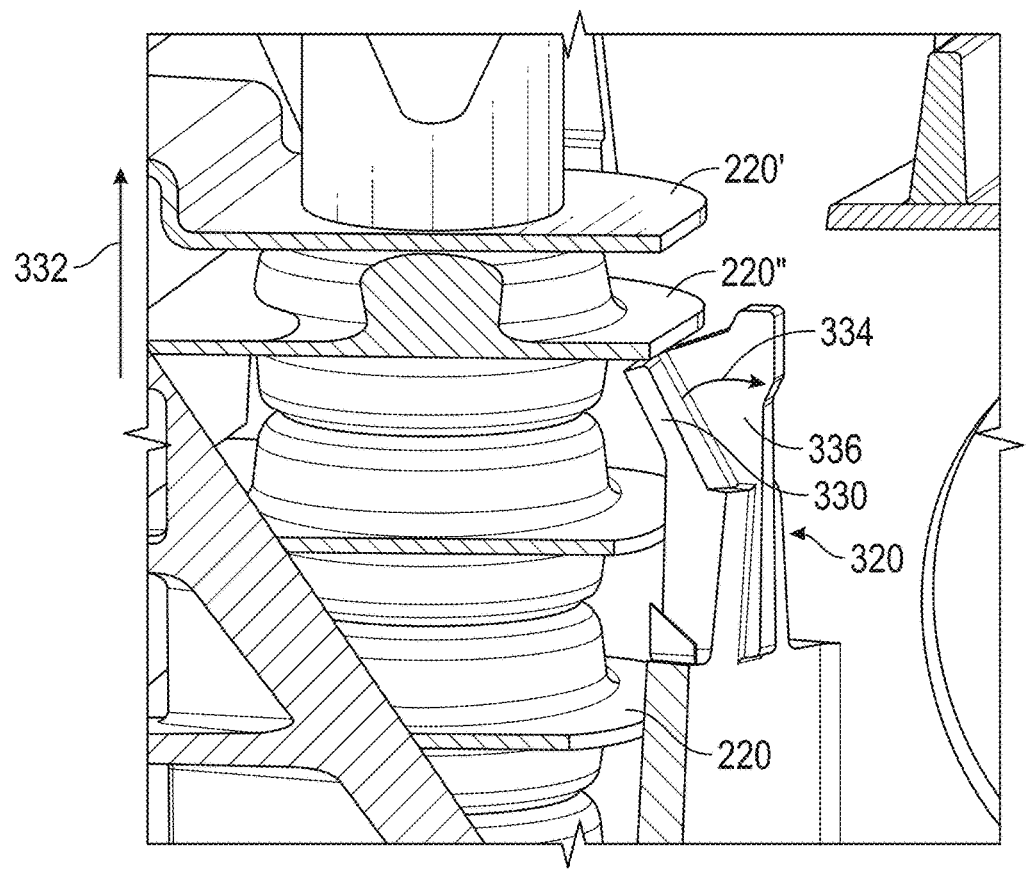
FIG. 6A illustrates a perspective view of a first flexible retainer of an example embodiment.
Figure 6B:
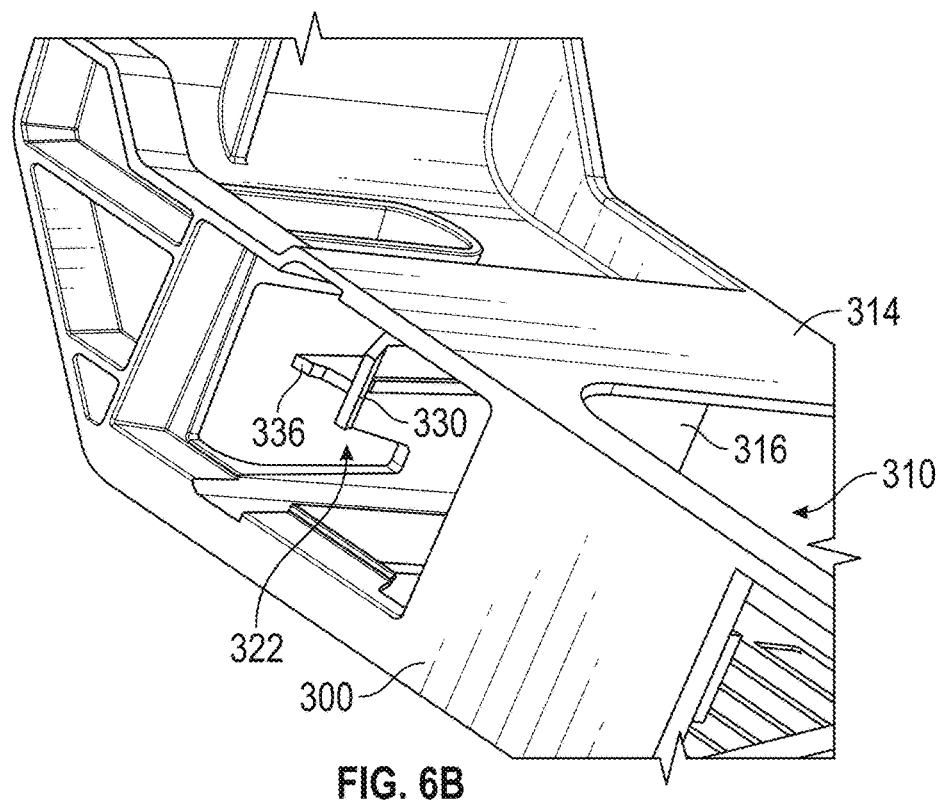
FIG. 6B illustrates a perspective view of a second flexible retainer of an example embodiment.

Referring now to FIG. 6A it should be appreciated that, in some cases, the first and second flexible retainers 320 and 322 may each be made of plastic and may therefore be somewhat flexible. In an example embodiment, the first and second flexible retainers 320 and 322 may each include an inclined portion 330 configured to extend inwardly into the bracket container 310 to slidingly engage the fins 220 responsive to insertion of the heat exchanger 150 into the bracket container 310 in the direction shown by arrow 332. During the sliding engagement, the inclined portion 330 may be moved outwardly (shown by arrow 334). This outward motion may be resisted by a rib portion 336 extending along an opposite side of the first and second flexible retainers 320 and 322 relative to the inclined portion 330. The rib portion 336 may therefore store energy when the fin 220' contacts the inclined portion 330 and pushes the inclined portion 330 in the direction of arrow 334. When the fin 220' passes beyond the distal end of the inclined portion 330 (as shown by fin 220' in FIG. 6A), the energy stored in the rib portion 336 may be released to move the inclined portion 330 in a direction opposite the direction of arrow 334. At this point, the inclined portion 330 may be poised to repeat the same movement cycle with a next fin 220".

The same cycle may then be repeated for the next fin 220". In this regard, insertion of the heat exchanger 150 into the bracket container 310 in direction 332 may cause the inclined portion 330 to slidingly engage the next fin 220". This sliding engagement may case the inclined portion 330 to be moved outwardly (shown by arrow 334) and such movement may be resisted by the rib portion 336 thereby storing energy in the rib portion 336. When the next fin 220" passes beyond the distal end of the inclined portion 330 (as shown by fin 220" in FIG. 6A), the energy stored in the rib portion 336 may be released to move the inclined portion 330 in the direction opposite the direction of arrow 334. At this point, the inclined portion 330 may be poised to repeat the same movement cycle again. However, if the heat exchanger 150 is fully inserted into the bracket container 310 at this point, then no further inward motion is to be expected, and the retaining of the heat exchanger 150 in the bracket container 310 is thereafter expected.

To accomplish retaining of the heat exchanger 150 in the bracket container 310, the distal end of the inclined portion 330 can now be seen to block motion of the next fin 220" in a direction opposite the insertion direction (i.e., opposite the direction of arrow 332). An operator may engage a tab 338 disposed at a distal end of the rib portion 336 to pull the tab 338) and the inclined portion 330 in the direction of arrow 334 to enable the next fin 220" (and subsequently also the fin 220') to be withdrawn past the inclined portion 330 in the direction opposite the direction of arrow 332 to withdraw the heat exchanger 150 from the bracket container 310

Thus, as can be appreciated from the description above, the first and second flexible retainers 320 and 322 (and/or the first and second flexible fingers that may embody the first and second flexible retainers 320 and 322) may be configured to be spring loaded by sliding engagement with fins 220 of the heat exchanger 150 responsive to insertion of the heat exchanger 150 into the bracket container 310 to enable the fins 220 to pass the first and second flexible retainers 320 and 322. After each fin 220 passes by the first and second flexible retainers 320 and 322 (or the inclined portions 330 thereof), the first and second flexible retainers 302 and 322 are released into a space between adjacent fins 220 and block the last fin 220 that passed in order to retain the heat exchanger 150 in the bracket container 310 by preventing withdrawal of the fins 220 from the bracket container 310.

Figure 7A:
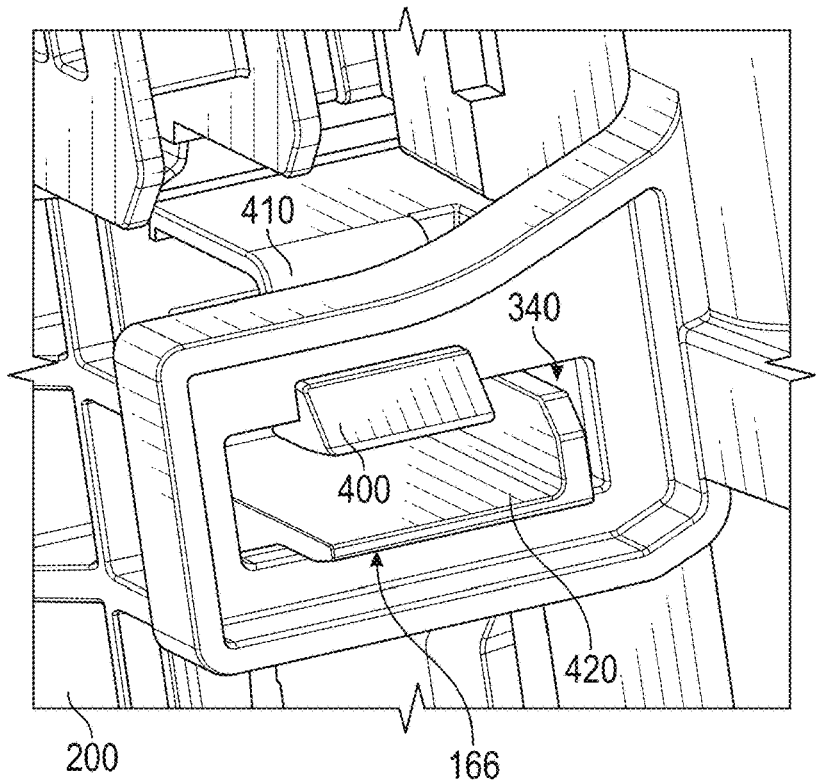
FIG. 7A illustrates a perspective view of a first mounting assembly in accordance with an example embodiment.
Figure 7B:
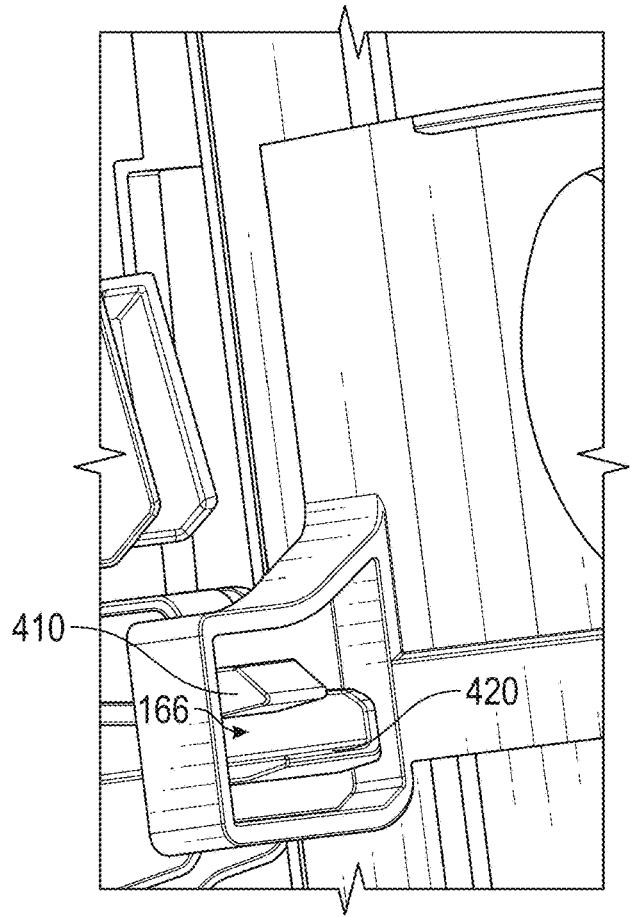
FIG. 7B illustrates an alternative perspective view of the first mounting assembly in accordance with an example embodiment.
Figure 7C:
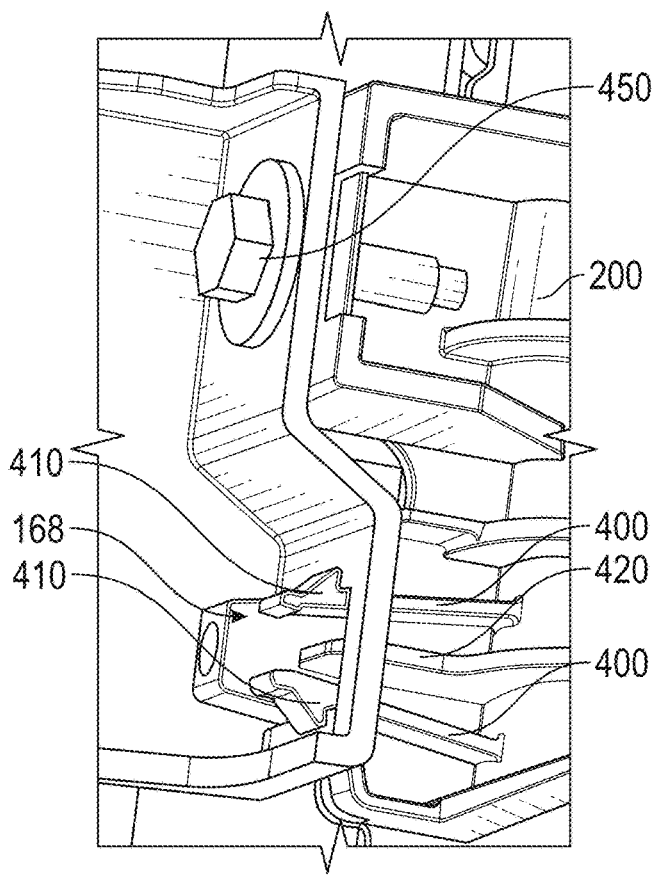
FIG. 7C illustrates a perspective view of a second mounting assembly in accordance with an example embodiment.
Figure 7D:
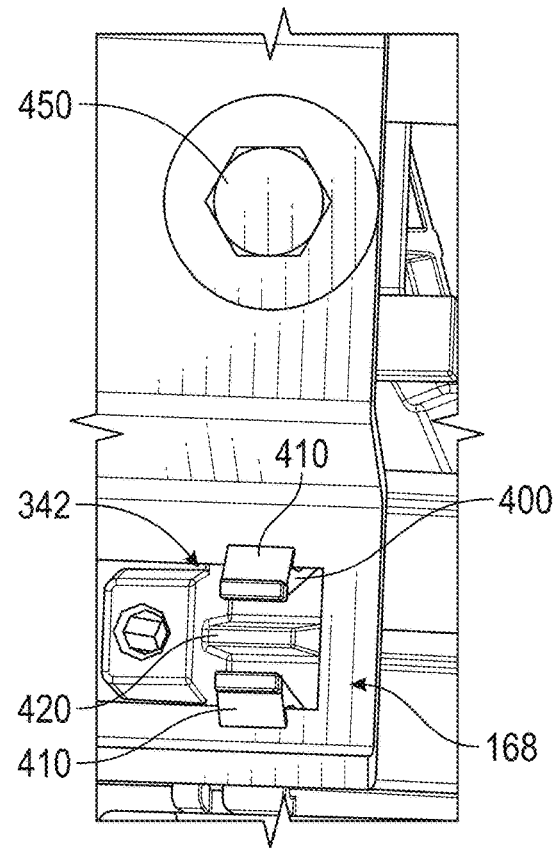
FIG. 7D illustrates an alternative perspective view of the second mounting assembly in accordance with an example embodiment.

The components used to mount the heat exchanger bracket 160 to the vehicle or cooling module 100 will now be described further in reference to the figures above, along with FIG. 7. In this regard, FIG. 7 is defined by FIGS. 7A, 7B, 7C and 7D and FIGS. 7A and 7B illustrate the first mounting assembly 162, whereas FIGS. 7C and 7D illustrate the second mounting assembly 164. As shown in FIGS. 7A and 7B, the first mounting assembly 162 may include a retention slot 340 formed proximate to the first end of the heat exchanger bracket 160 to operably couple the first mounting assembly 162 to one of the frame members 200 (see FIG. 2) via the first free floating retention point 166 which, in some embodiments, may be embodied as a snap clip. The second mounting assembly 164 may include a retention slot 342 formed proximate to the second end of the heat exchanger bracket 160 to operably couple the second mounting assembly 164 to the other one of the frame members 200 via the second free floating retention point 168, which may also be embodied as a snap clip. The slots retention 340 and 342 may be longer in the horizontal direction (which may be referred to as a first reference direction extending from the first to the second end of the heat exchanger bracket 160) than they are in the vertical direction (e.g., second reference direction).

In some cases, one or both of the snap clips that form the first and second retention points 166 and 168 may include one or more instances of a spring loaded plastic blade 400. The plastic blades 400 of each of the first and second retention points 166 and 168 may each lie in a plane that extends parallel to the first reference direction. The plastic blades 400 may be bendable or capable of being deflected in the second reference direction, and may include a retention rib 410 disposed at or near a distal end thereof. The retention rib 410 may be formed to have a substantially triangular shaped cross section when bisected. Thus, the retention rib 410 may allow the plastic blade 400 to be deflected in the second reference direction while the first and/or second free floating retention points 166 and 168 are inserted into respective ones of the retention slots 340 and 342. Then, after the retention ribs 410 have passed into the respective ones of the retention slots 340 and 342, the plastic blades 400 may unload and extend opposite the direction of deflection. The retention ribs 410 may then prevent withdrawal of the first and second free floating retention points 166 and 168 from respective ones of the retention slots 340 and 342 unless an operator manually deflects the plastic blades 400 to allow such withdrawal. Thus, the first and second free floating retention points 166 and 168, by virtue of the inclusion of the retention ribs 410 on the plastic blades 400 provide some significant advantages in terms of the means by which the heat exchanger bracket 160 is affixed to the frame members 200.

In this regard, for example, the retention ribs 410 are configured to prevent dislodging of the plastic blades 400 from the retention slot 340 and 342 formed at respective ones of the first and second mounting assemblies 162 and 164. Each of the first and second free floating retention points 166 and 168 may therefore be configured to allow freedom of movement of the heat exchanger bracket 160 relative to a portion of a vehicle or automotive cooling module to which the heat exchanger bracket 160 is attached (e.g., the frame members 200) along the first reference direction and at least other direction that is substantially perpendicular to the first reference direction (e.g., the second reference direction). In other words, the retention slots 340 and 342 may be longer than the plastic blades 400 in the first reference direction so that side-to-side motion of the heat exchanger bracket 160 can be tolerated without stressing the heat exchanger bracket 160. Similarly, the flexibility of the plastic blades 400 may further allow the first and second free floating retention points 166 and 168 to allow some movement in the second reference direction.

In some cases, either or both of the first and second free floating retention points 166 and 168 may include one instance of the plastic blade 400 and the retention rib 410. In such cases, a fixed projection 420 may be provided on an opposite side of the plastic blade 400 relative to the retention rib 410 (and/or at least partially alongside the plastic blade 400). However, in other examples, two instances of the plastic blade 400 may be provided with corresponding instances of the retention rib 410 on each one facing in opposite directions. The first free floating retention point 166 of FIGS. 7A and 7B is an example of the former (i.e., one plastic blade 400 and one retention rib 410 with a fixed projection opposite and partially alongside the plastic blade 400). Meanwhile, the second free floating retention point 168 of FIGS. 7C and 7D is an example of the latter (i.e., two plastic blades 400 and two retention ribs 410 facing in opposite directions and on opposite sides of the fixed projection 420 (and partially alongside therewith as well).

In some cases, the heat exchanger bracket 160 may include one instance of a fixed point fastener 450 at one of the first end or the second end of the heat exchanger bracket 160. In this example, the fixed point fastener 450 is provided proximate to the second free floating retention point 168 (e.g., on the driver's side of the vehicle). The fixed point fastener 450 may be a standard steel screw, which may be affixed with a standard nut or J clip, or any other suitable fixing means.

A heat exchanger bracket for an automotive cooling module may therefore be provided. The heat exchanger bracket may include a first mounting assembly disposed at a first end of the heat exchanger bracket, a second mounting assembly disposed at a second end of the heat exchanger bracket, and a bracket container disposed between the first and second ends of the heat exchanger bracket. The first mounting assembly may include a first free floating retention point, and the second mounting assembly may include a second free floating retention point. The bracket container may be configured to receive a heat exchanger. The bracket container may include a first flexible retainer disposed at a first longitudinal end thereof, and a second flexible retainer disposed at a second longitudinal end thereof. The first and second flexible retainers may be configured to engage opposing longitudinal ends of the heat exchanger responsive to insertion of the heat exchanger into the bracket container.

The heat exchanger bracket of some embodiments may include additional features, modifications, augmentations and/or the like to achieve further objectives or enhance durability of the heat exchanger bracket. Similarly, a cooling module comprising the heat exchanger bracket described above may include additional features, modifications, augmentations and/or the like. The additional features, modifications, augmentations and/or the like may be added in any combination with each other. Below is a list of various additional features, modifications, and augmentations that can each be added individually or in any combination with each other. For example, the first flexible retainer may include a first flexible finger biased to engage a first longitudinal end of the heat exchanger, and the second flexible retainer may include a second flexible finger biased in an opposite direction relative to the first flexible finger to engage a second longitudinal end of the heat exchanger. Within this context, the first and second longitudinal ends of the heat exchanger are the opposing longitudinal ends of the heat exchanger. In an example embodiment, the first and second flexible fingers may each be made of plastic and may be spring loaded by engagement with a respective fin of the heat exchanger responsive to insertion of the heat exchanger into the bracket container to enable the respective fin to pass the first and second flexible fingers and release into a space between the respective fin and a corresponding adjacent fin to retain the heat exchanger in the bracket container by preventing withdrawal of the respective fin from the bracket container. In some cases, the first and second flexible fingers may each include an inclined portion configured to extend inwardly into the bracket container to slidingly engage the respective fin responsive to insertion of the heat exchanger into the bracket container, and a rib portion extending along an opposite side of the first and second flexible fingers relative to the inclined portion. In an example embodiment, the heat exchanger bracket may be molded from flexible plastic material. In some cases, the heat exchanger bracket may extend from the first end to the second end in a first reference direction. Each of the first and second free floating retention points may be configured to allow freedom of movement of the heat exchanger bracket relative to a portion of a vehicle or automotive cooling module to which the heat exchanger bracket is attached along the first reference direction and at least one additional direction substantially perpendicular to the first reference direction. In an example embodiment, the first and second free floating retention points may each include or be embodied as a respective instance of a snap clip. In some cases, the snap clip may include a spring loaded plastic blade. In an example embodiment, the spring loaded plastic blade may further include a retention rib configured to prevent dislodging of the spring loaded plastic blade from a retention slot formed at respective ones of the first and second mounting assemblies. In some cases, the heat exchanger bracket further includes a single fixed point fastener at one of the first end or the second end of the heat exchanger bracket.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A heat exchanger bracket for an automotive cooling module of a vehicle, the heat exchanger bracket comprising:
   a first mounting assembly disposed at a first end of the heat exchanger bracket, the first mounting assembly comprising a first free floating retention point;
   a second mounting assembly disposed at a second end of the heat exchanger bracket, the second mounting assembly comprising a second free floating retention point; and
   a bracket container disposed between the first and second ends of the heat exchanger bracket, the bracket container being configured to receive a heat exchanger,
   wherein the bracket container includes a first flexible retainer disposed at a first longitudinal end thereof, and a second flexible retainer disposed at a second longitudinal end thereof,
   wherein the first and second flexible retainers are configured to engage opposing longitudinal ends of the heat exchanger responsive to insertion of the heat exchanger into the bracket container,
   wherein the first and second free floating retention points each comprise a respective instance of a snap clip and a retention slot that, together, operably couple the heat exchanger bracket to a portion of the vehicle, and
   wherein relative sizing of the retention slot and the snap clip at each of the first and second free floating retention points provides freedom of movement of the heat exchanger bracket relative to the portion of the vehicle to which the heat exchanger bracket is operably coupled.

2. The heat exchanger bracket of claim 1, wherein the first flexible retainer comprises a first flexible finger biased to engage a first longitudinal end of the heat exchanger, and
   wherein the second flexible retainer comprises a second flexible finger biased in an opposite direction relative to the first flexible finger to engage a second longitudinal end of the heat exchanger, the first and second longitudinal ends of the heat exchanger comprising the opposing longitudinal ends of the heat exchanger.

3. The automotive cooling module of claim 2, wherein the heat exchanger bracket is molded from flexible plastic material.

4. The heat exchanger bracket of claim 2, wherein the first and second flexible fingers are each made of plastic and are spring loaded by engagement with a respective fin of the heat exchanger responsive to insertion of the heat exchanger into the bracket container to enable the respective fin to pass the first and second flexible fingers and release into a space between the respective fin and a corresponding adjacent fin to retain the heat exchanger in the bracket container by preventing withdrawal of the respective fin from the bracket container.

5. The heat exchanger bracket of claim 4, wherein the first and second flexible fingers each include an inclined portion configured to extend inwardly into the bracket container to slidingly engage the respective fin responsive to insertion of the heat exchanger into the bracket container, and a rib portion extending along an opposite side of the first and second flexible fingers relative to the inclined portion.

6. The heat exchanger bracket of claim 2, wherein the heat exchanger bracket is molded from flexible plastic material.

7. The heat exchanger bracket of claim 1, wherein the heat exchanger bracket extends from the first end to the second end in a first reference direction,
   wherein each of the first and second free floating retention points are configured to allow freedom of movement of the heat exchanger bracket along the first reference direction and at least one additional direction substantially perpendicular to the first reference direction.

8. The heat exchanger bracket of claim 7, wherein the snap clip comprises a spring loaded plastic blade.

9. The heat exchanger bracket of claim 8, wherein the spring loaded plastic blade further comprises a retention rib configured to prevent dislodging of the spring loaded plastic blade from the retention slot formed at respective ones of the first and second free floating retention points.

10. The heat exchanger bracket of claim 9, further comprising a single fixed point fastener at one of the first end or the second end of the heat exchanger bracket.

11. An automotive cooling module of a vehicle comprising a radiator, a cooling fan, a condenser and a heat exchanger assembly, the heat exchanger assembly comprising a heat exchanger and a heat exchanger bracket, the heat exchanger bracket comprising:
    a first mounting assembly disposed at a first end of the heat exchanger bracket, the first mounting assembly comprising a first free floating retention point;
    a second mounting assembly disposed at a second end of the heat exchanger bracket, the second mounting assembly comprising a second free floating retention point; and
    a bracket container disposed between the first and second ends of the heat exchanger bracket, the bracket container being configured to receive the heat exchanger,
    wherein the bracket container includes a first flexible retainer disposed at a first longitudinal end thereof, and a second flexible retainer disposed at a second longitudinal end thereof,
    wherein the first and second flexible retainers are configured to engage opposing longitudinal ends of the heat exchanger responsive to insertion of the heat exchanger into the bracket container,
    wherein the first and second free floating retention points each comprise a respective instance of a snap clip and a retention slot that, together, operably couple the heat exchanger bracket to a portion of the vehicle, and
    wherein relative sizing of the retention slot and the snap clip at each of the first and second free floating retention points provides freedom of movement of the heat exchanger bracket relative to the portion of the vehicle to which the heat exchanger bracket is operably coupled.

12. The automotive cooling module of claim 11, wherein the heat exchanger bracket extends from the first end to the second end in a first reference direction, wherein each of the first and second free floating retention points are configured to allow freedom of movement of the heat exchanger bracket along the first reference direction and at least one additional direction substantially perpendicular to the first reference direction.

13. The automotive cooling module of claim 11, wherein the first flexible retainer comprises a first flexible finger biased to engage a first longitudinal end of the heat exchanger, and
wherein the second flexible retainer comprises a second flexible finger biased in an opposite direction relative to the first flexible finger to engage a second longitudinal end of the heat exchanger, the first and second longitudinal ends of the heat exchanger comprising the opposing longitudinal ends of the heat exchanger.

14. The automotive cooling module of claim 13, wherein the first and second flexible fingers are each made of plastic and are spring loaded by engagement with a respective fin of the heat exchanger responsive to insertion of the heat exchanger into the bracket container to enable the respective fin to pass the first and second flexible fingers and release into a space between the respective fin and a corresponding adjacent fin to retain the heat exchanger in the bracket container by preventing withdrawal of the respective fin from the bracket container.

15. The automotive cooling module of claim 14, wherein the first and second flexible fingers each include an inclined portion configured to extend inwardly into the bracket container to slidingly engage the respective fin responsive to insertion of the heat exchanger into the bracket container, and a rib portion extending along an opposite side of the first and second flexible fingers relative to the inclined portion.

16. The automotive cooling module of claim 12, wherein the snap clip comprises a spring loaded plastic blade.

17. The automotive cooling module of claim 16, wherein the spring loaded plastic blade further comprises a retention rib configured to prevent dislodging of the spring loaded plastic blade from the retention slot formed at respective ones of the first and second free floating retention points.

18. The automotive cooling module of claim 17, further comprising a single fixed point fastener at one of the first end or the second end of the heat exchanger bracket.

* * * * *